US012415758B2

(12) United States Patent
Gu et al.

(10) Patent No.: US 12,415,758 B2
(45) Date of Patent: Sep. 16, 2025

(54) MATTE CERAMIC TILE AND PREPARATION METHOD THEREOF

(71) Applicants: DONGGUAN CITY WONDERFUL CERAMICS INDUSTRIAL PARK CO., LTD., Guangdong (CN); JIANGXI HEMEI CERAMICS CO., LTD., Jiangxi (CN); CHONGQING WONDERFUL CERAMICS CO., LTD., Chongqing (CN); JIANGXI WONDERFUL CERAMICS CO., LTD., Jiangxi (CN); GUANGDONG JIAMEI CERAMICS CO., LTD., Guangdong (CN)

(72) Inventors: Zhanwen Gu, Guangdong (CN); Yanjun Wang, Guangdong (CN); Jiangwen Deng, Guangdong (CN); Huiyin Xiao, Guangdong (CN); Quan Yang, Guangdong (CN); Chaoxian Pan, Guangdong (CN); Yongqiang Wang, Guangdong (CN); Xuebin Liu, Guangdong (CN); Junjun Jiang, Guangdong (CN); Jun Wang, Guangdong (CN)

(73) Assignees: DONGGUAN CITY WONDERFUL CERAMICS INDUSTRIAL PARK CO., LTD., Dongguan (CN); JIANGXI HEMEI CERAMICS CO., LTD., Yichun (CN); CHONGQING WONDERFUL CERAMICS CO., LTD., Chongqing (CN); JIANGXI WONDERFUL CERAMICS CO., LTD., Yichun (CN); GUANGDONG JIAMEI CERAMICS CO., LTD., Qingyuan (CN)

( * ) Notice: Subject to any disclaimer, the term of this patent is extended or adjusted under 35 U.S.C. 154(b) by 150 days.

(21) Appl. No.: 18/228,666

(22) Filed: Jul. 31, 2023

(65) Prior Publication Data
US 2023/0382804 A1 Nov. 30, 2023

Related U.S. Application Data

(63) Continuation-in-part of application No. 16/762,916, filed as application No. PCT/CN2019/092693 on Jun. 25, 2019, now abandoned.

(30) Foreign Application Priority Data

Apr. 8, 2019 (CN) .......................... 201910277756.3

(51) Int. Cl.
*C04B 33/04* (2006.01)
*C03C 1/00* (2006.01)
*C03C 3/087* (2006.01)
*C03C 8/02* (2006.01)
*C03C 8/20* (2006.01)
*C04B 33/13* (2006.01)
*C04B 33/132* (2006.01)
(Continued)

(52) U.S. Cl.
CPC .............. *C04B 33/04* (2013.01); *C03C 1/002* (2013.01); *C03C 3/087* (2013.01); *C03C 8/02* (2013.01); *C03C 8/20* (2013.01); *C04B 33/1305* (2013.01); *C04B 33/1315* (2013.01); *C04B 33/1324* (2013.01); *C04B 33/18* (2013.01); *C04B 33/30* (2013.01); *C04B 33/34* (2013.01); *C04B 41/0072* (2013.01); *C04B 41/4578* (2013.01); *C04B 41/5022* (2013.01); *C04B 41/86* (2013.01); *C03C 2209/00* (2013.01); *C04B 2235/3472* (2013.01); *C04B 2235/349* (2013.01); *C04B 2235/40* (2013.01); *C04B 2235/448* (2013.01); *C04B 2235/606* (2013.01); *C04B 2235/6567* (2013.01)

(58) Field of Classification Search
CPC . C04B 41/522; C04B 41/5022; C04B 41/009; C04B 33/34; C04B 33/30; C04B 33/1324; C04B 33/1321; C04B 33/1315; C04B 2235/604; C04B 2235/448; C04B 2235/349; C04B 2235/3472; C04B 2235/3463; C03C 8/04; C03C 8/02
See application file for complete search history.

(56) References Cited

U.S. PATENT DOCUMENTS

| | | | | | |
|---|---|---|---|---|---|
| 4,880,759 | A | * | 11/1989 | Kohut | C04B 33/04 501/148 |
| 6,239,053 | B1 | * | 5/2001 | Petschauer | C03B 18/16 501/128 |
| 2002/0066233 | A1 | * | 6/2002 | McArdle | C04B 35/6316 51/308 |

FOREIGN PATENT DOCUMENTS

| | | |
|---|---|---|
| CN | 102173736 A | 9/2011 |
| CN | 105000916 A | 10/2015 |

* cited by examiner

*Primary Examiner* — Alex B Efta

(57) ABSTRACT

A blank material for a ceramic tile consists of the following components in percentage by weight: nepheline powder: 10%-15%; clay with a carbon content of ≥3.0 wt %: 10%-15%; clay with a carbon content of ≤0.5 wt %: 15%-22%; clay with a carbon content between 0.5 wt % and 3.0 wt %: 10%-15%; recycled waste blank: 5%-10%; sodium potassium powder: 5%-10%; sodium feldspar powder: 12%-20%; desulfurization residue: 0%-7%; waste from edging and polishing: 15%-26%; waste porcelain powder: 5%-10%; liquid gel remover: 0.3%-1.0%; liquid reinforcing agent: 0.2%-0.8%. Its preparation method comprises the following steps: preparing raw materials for a blank body and ball milling, powder spray granulation, aging, pressing and molding of the blank body, drying, polishing the blank body, spraying water, glazing, applying a decorative pattern, firing.

10 Claims, No Drawings

(51) Int. Cl.
*C04B 33/18* (2006.01)
*C04B 33/30* (2006.01)
*C04B 33/34* (2006.01)
*C04B 41/00* (2006.01)
*C04B 41/45* (2006.01)
*C04B 41/50* (2006.01)
*C04B 41/86* (2006.01)

MATTE CERAMIC TILE AND PREPARATION METHOD THEREOF

CROSS REFERENCE TO THE RELATED APPLICATIONS

This application is a Continuation-in-part application of U.S. application Ser. No. 16/762,916, filed on May 9, 2020, which is the national stage of International Application No. PCT/CN2019/092693, filed on Jun. 25, 2019, which is based upon and claims priority to Chinese Patent Application No. 201910277756.3, filed on Apr. 8, 2019. The entire contents of the above-identified applications are incorporated herein by reference.

FIELD OF THE INVENTION

This invention relates to the field of ceramic production, and in particular to a matte ceramic tile and a preparation method thereof.

BACKGROUND OF THE INVENTION

CN201710408570.8 discloses a matte raw material glaze, its preparation method, and its application. The objective is to eliminate undesirable features from a matte glaze product, such features include a texture that is rough to the touch, unstable corrosion resistance, and poor color development of the inkjet ink. Its technical solution is as follows: the method for preparing the matte raw material glaze includes the following steps: taking 1 to 5 parts of zinc oxide, 15 to 35 parts of barium carbonate, 15 to 30 parts of potassium feldspar, 0 to 10 parts of sodium feldspar, 0-10 parts of dolomite, 3-10 parts of kaolin, 4-15 parts of quartz, and 4-15 parts of calcium phosphate (all in parts by mass); then, adding sodium tripolyphosphate and carboxymethyl cellulose, followed by 50-70 parts of water; ball grinding until the material is able to pass a 325 mesh sieve; aging for more than 24 hours to obtain the product. A drawback of this method is that the preparation process is relatively complicated. In the methods disclosed by CN201110292141.1, CN201310076559.8, CN201710408570.8, CN201710321330.4, CN201810053256.7, among others, various amounts of barium carbonate, strontium compounds, tin oxide, or titanium dioxide are included in the glaze formulation. These materials have different degrees of toxicity and may easily affect the physical and mental health of human beings during use. On Oct. 27, 2017, the International Agency for Research on Cancer of the World Health Organization published a list of carcinogens, and titanium dioxide is classified as a category 2B carcinogen. Besides, the glaze contains titanium dioxide, which contributes to the yellow color that appears on the glazed surface of the product, affecting the richness of the decorative pattern.

SUMMARY OF THE INVENTION

The objective of the present invention is to provide an environmentally friendly method for preparing a matte ceramic tile. The method involves a one-time glazing method, which reduces the consumption of glaze material, reduces the likelihood of developing product defects, simplifies the production process, and reduces production difficulty. Raw materials with relatively small impacts on health and safety are used, and a variety of solid wastes are consumed in this process.

The technical solution of the present invention is a matte ceramic tile, wherein a blank material for the ceramic tile consists of the following components in percentage by weight: nepheline powder: 10%-15%; clay with a carbon content of ≥3.0 wt %: 10%-15%; clay with a carbon content of ≤0.5 wt %: 15%-22%; clay with a carbon content between 0.5 wt % and 3.0 wt %: 10%-15%; recycled waste blank: 5%-10%; sodium potassium powder: 5%-10%; sodium feldspar powder: 12%-20%; desulfurization residue: 0%-7%; waste from edging and polishing: 15%-26%; waste porcelain powder: 5%-10%; liquid gel remover: 0.3%-1.0%; liquid reinforcing agent: 0.2%-0.8%; wherein the desulfurization residue is a desulfurized gypsum produced by treating a kiln flue gas with a wet desulfurization method; the desulfurized gypsum comprises calcium sulfate dihydrate ($CaSO_4 \cdot 2H_2O$) crystal and water, with a mass proportion of water ranging from 25-35%.

Preferably, the waste from edging and polishing consists of water and a solid waste gathered from edging and polishing of a semi-finished ceramic product, the solid waste comprises $SiO_2$, $Al_2O_3$, $CaO$, $K_2O$, $Na_2O$, $MgO$, $MgCl_2$, and $SiC$, wherein a total content of $SiO_2$, $Al_2O_3$ is greater than 83 wt %; the waste from edging and polishing has a water content of 32 wt % to 36 wt %.

Preferably, the matte ceramic tile according to claim 1, wherein the liquid gel remover is one or more selected from the group consisting of methacrylic acid, sodium methallylsulfonate, sodium persulfate, hydroquinone, polyimide, sodium hydroxide, sodium chloride, and sodium carbonate; the liquid gel remover has a pH of 7.0 to 9.0.

Preferably, the liquid reinforcing agent is one or more selected from the group consisting of modified lignin, polyvinyl alcohol, polyacrylate, sodium polyacrylate, water glass, and a phosphate salt.

Another technical solution of the present invention is a method for preparing a matte ceramic tile, comprising the following steps:

(1) preparing raw materials for a blank body: preparing the raw materials according to a predetermined ratio, feeding the raw materials directly into a three-stage continuous ball mill, adding water to obtain a mixture with a water content of 32 wt % to 35 wt %, and ball milling continuously for 2 to 5 hours to obtain a slurry; the raw materials include waste from edging and polishing, desulfurization residue, waste porcelain powder, nepheline powder, sodium potassium powder, potassium feldspar powder, and a carbon-containing clay;

(2) powder spray granulation: storing the slurry produced by the continuous ball mill in an underground slurry tank; transferring the slurry into a drying tower by a plunger pump after aging and homogenization for powder spray granulation; a powder obtained by powder spray granulation has a volumetric weight of 1.0 to 1.1 $g/cm^3$ and a water content of 6.0 wt % to 6.5 wt %;

(3) aging: conveying the powder obtained by powder spray granulation to a powder silo directly with a belt, aging the powder in the powder silo for more than 48 hours before pressing and molding; water content of the powder after aging is 5.0% to 6.0%;

(4) pressing and molding of the blank body: transporting the powder after aging to a hopper provided at the top of a press; pushing the powder into a mold frame of the press by a grid distributor; applying pressure to the powder by the press to partially release gas trapped in voids of the powder, causing powder particles to shift and combine through internal frictional forces to take on a desired shape, forming a blank body; the shape of the blank body formed has a cross-section identical to that of a mold, and shapes of an upper surface and a lower surface of the blank body are determined by shapes of an upper press mold and a lower press mold in the mold frame;

(5) drying: drying the blank body in a roller hearth furnace having 3 to 5 layers; a maximum drying temperature is 160° C. to 200° C., drying time is 30 min to 60 min; strength of the blank body after drying is 1.2 Mpa to 1.8 Mpa, a water content of a dried blank body is <0.1 wt %;

(6) polishing the blank body: polishing a surface of the blank body coming out from the roller hearth furnace by a blank body polishing machine;

(7) spraying water: spraying water onto the upper surface of the blank body by a high-pressure water-spraying cabinet equipped with a spray gun; the spray gun has a nozzle size of 0.36 mm; water pressure during spraying is 12 bar to 18 bar, water is sprayed in an amount of 55 g/m² to 100 g/m²;

(8) glazing: glazing is performed using a linear glazing machine with the following process parameters: specific gravity of a glaze slurry: 1.45 to 1.80; time taken for a glaze slurry to flow out of a viscometer, determined according to Chinese national standard GB/T1723 Paint Viscosity Determination Method: 18 s to 30 s; and a thickness of a glaze layer: 0.03 mm to 0.1 mm;

(9) applying a decorative pattern: applying a decorative pattern to a glazed surface of the blank body via any one of screen printing, rubber roller printing, and inkjet printing; and

(10) firing: transferring a decorated blank body from the previous step to a firing kiln for firing at a firing temperature of 1050° C. to 1170° C. and a firing time of 50 min to min, wherein a firing time for a stage of between 1150° C. to 1170° C. is 6 min to 10 min.

Preferably, the desulfurization residue in step (1) is a desulfurized gypsum produced by treating a kiln flue gas with a wet desulfurization method; a main component of the desulfurized gypsum is calcium sulfate dihydrate ($CaSO_4·2H_2O$) crystal, a major impurity of the desulfurized gypsum is calcium carbonate; the desulfurized gypsum has a purity of 90% to 95%, a water content of 10 wt % to 15 wt %, and a particle size of 30 nm to nm.

Preferably, the carbon-containing clay in step (1) is selected from one of the following:

(1) clay with a carbon content of ≥3.0 wt % and clay with a carbon content of ≤0.5 wt %;

(2) clay with a carbon content of ≤0.5 wt %; and (3) clay with a carbon content of ≤0.5 wt % and clay with a carbon content between 0.5 wt % and 3.0 wt %.

Preferably, the glaze in step (8) is a matte glaze slurry consisting of a leveling agent and a matte glaze slurry;

the leveling agent is one or more selected from the group consisted of a polyacrylic acid leveling agent, a phosphate ester modified acrylic acid leveling agent, a fluorine modified acrylic acid leveling agent, a butyl acrylate leveling agent, a silicone leveling agent, a polyether polyester modified silicone, a polyether-modified silicone, a polymethylalkylsiloxane, an alkyl-modified organosiloxane, an end-group modified silicone, and a fluorocarbon leveling agent;

the matt glaze slurry consists of 20 wt %-30 wt % of the levelling agent and 70 wt %-80 wt % of the matte slurry;

the matte glaze slurry is made from ball-milling 64 wt %-74 wt % of a matte glaze powder, 0.2 wt %-1.2 wt % of an additive, and 25 wt %-35 wt % of water for 5 to 8 hours; fineness of the matte glaze slurry is to an extent that 0.8 wt %-1.2 wt % of the matte glaze slurry is unable to pass a 325 mesh sieve.

Preferably, the matte glaze powder consists of the following components: nepheline: 8 wt %-13 wt %; albite: 5 wt %-10 wt %; FMC633 frit: 10 wt %-15 wt %; FMC689 frit: 28 wt %-35 wt %; FMC053 frit: 8 wt %-12 wt %; zinc phosphate: 2 wt %-10 wt %; zinc oxide: 2 wt %-6 wt %; wollastonite: 2 wt %-5 wt %; aluminium oxide: 1 wt %-7 wt %; bentonite: 0 wt %-1 wt %; ultrafine zirconia ($ZrO_2$): 0 wt %-10 wt %; recycled material from scrapping: 5 wt %-15 wt %; ball clay: 7 wt %-10 wt %; carboxymethyl cellulose: 0.2 wt %-0.3 wt %; sodium tripolyphosphate: 0.3 wt %-0.5 wt %; the ultrafine zirconia has $D_{50}$ of below 0.47 μm, $D_{90}$ of below 1.0 μm; $ZrO_2$ has a purity of ≥93.27, a refractive index of 1.93-2.01, a melting point of 2370° C. to 2700° C.

Preferably, calcium and magnesium are introduced into a formulation of the FMC633 frit; the FMC633 frit comprises the following main chemical components in percentage by weight:

ignition loss (I.L)≤0.05%; $SiO_2$: 51.35%; $Al_2O_3$: 11.97%; $Fe_2O_3$: 0.05%; CaO: 17.92%; MgO: 8.25%; $K_2O$: 2.86%; $Na_2O$: 2.39%; $ZrO_2$: 5.16%;

the FMC633 frit has a maturation temperature of lower than 1050° C.;

aluminium and calcium are introduced into a formulation of the FMC689 frit; the FMC689 frit comprises the following main chemical components in percentage by weight:

I.L≤0.05%; $SiO_2$: 54.52%; $Al_2O_3$: 21.73%; $Fe_2O_3$: 0.07%; CaO: 15.11%; MgO: 0.23%; $K_2O$: 3.49%; $Na_2O$: 2.43%; $B_2O_3$: 1.89%; ZnO: 0.48%;

the FMC689 frit has a maturation temperature of above 1050° C.;

zinc and zirconium are introduced into a formulation of the FMC053 frit; the FMC053 frit comprises the following main chemical components in percentage by weight:

I.L≤0.05%; $SiO_2$: 44.67%; $Al_2O_3$: 16.36%; $Fe_2O_3$: 0.05%; CaO: 4.1%; MgO: 0.30%; $K_2O$: 1.76%; $Na_2O$: 2.72%; $B_2O_3$: 2.59%; ZnO: 15.03%; $ZrO_2$: 11.20%; $P_2O_5$: 1.17%;

the FMC053 frit has a maturation temperature of 1100° C. to 1170° C.;

the recycled material from scrapping consists of a blank material and a glaze material, wherein the glaze material comprises a base glaze and a transparent glaze, the recycled material from scrapping has a water content of 9 wt % to 13 wt % and fineness of <1%; the recycled material from scrapping comprises the following chemical components in percentage by weight:

IL.: 5%-6%; $SiO_2$: 59%-61%; $Al_2O_3$: 20%-21%; $Fe_2O_3$: 0.1%-0.2%; CaO: 4.5%-5%; MgO: 3%-3.8%; $K_2O$: 1%-1.5%; $Na_2O$: 2.5%-3%; and $ZrO_2$: 0.2%-0.8%.

Compared with the prior art, the beneficial effects of the present invention are as follows:

(1) In the preparation process of the present invention, raw materials with relatively little negative impact on health and safety are used, and a large number of solid wastes are consumed. This is environmentally friendly and creates economic benefits through recycling. A one-time glazing method is adopted, which reduces the consumption of glaze, reduces the likelihood of developing product defects, simplifies the production process, and reduces production difficulty.

(2) In the present invention, the blank body is allowed to have a smooth surface through adjusting the fineness and water content of the slurry, the grain composition of the powder, and the bulk density (which indicates the compactness of the powder), and employing a uniform material distribution technique and a blank polishing technique, etc. The matt glaze material comprises a combination of a number of frits; at high temperatures, the frits turn into a liquid phase having good fluidity, which is able to efficiently assist the melting of the other materials, allowing fast leveling. Meanwhile, the firing range of the product is also greatly expanded, allowing the product to be fired in different kilns under different process conditions. The glazed surface of the product could develop a smooth texture more easily. The gloss of the glazed surface is 9-15 degrees.

(3) The smoothness of the glazed surface and the quality of the product of the present invention are superior to the other products in the same category. The chemical corrosion resistance and pollution resistance of the products of the present invention match the highest level of Chinese national standards. Any blue ink, red ink, black ink, water-based or oil-based markers contaminating the glazed surface could be easily wiped away; these glazed surfaces can be easily cleaned and are stain-resistant. Wear resistance of the product matches Chinese national quality control standards. We use the term "wear" to quantitatively characterize the wear resistance of the product. The wear of the product produced according to the method of the present invention is less than 0.25 g/m 3 (the wear extent of the product at 12,000 rpm).

(4) The recycled material from scrapping used in the present invention is the raw material obtained by scraping the glazed edges of the blank body that is advancing on the conveyor line after the glazing process and before firing in the kiln. The scraping of the glazed edge of the blank body is to prevent the glaze on the edges of the blank body from turning into a flowing liquid-phase glaze during high-temperature firing—the liquid-phase glaze may adhere to the roller to form a nail, which may scratch or lift the product being fired in the kiln, resulting in cracks, central cracks, wave deformation and other defects of the product.

(5) The bentonite and ball clay used in the present invention have fine particle sizes, and good thickening effects, suspension stability, lubricity, film-forming abilities, water resistance, high-temperature stability, and chemical stability. They give rise to a high degree of whiteness after firing and allow the glaze slurry to have a desirable suspension property. As a result, the glaze is smooth and has a good covering ability. The bentonite and ball clay strengthen the connection between the glaze and blank, and reduce the number of defects on the glazed surface.

(6) The leveling agent in the matt glaze of the present invention has the following characteristics: smooth, anti-stick, wet, low surface tension, fast leveling speed, and good miscibility with the glaze slurry. After being added to the glaze slurry at a certain ratio, it significantly reduces the surface tension of the glaze slurry system and improves the flowing and leveling abilities of the system, and could defoam. During the drying of the silky matte slurry paste on the surface of the blank body, the leveling agent quickly eliminates defects such as sand holes, shrinkage cavities, pinholes, orange peel on surfaces, and craters, thereby promoting the formation of a flat, smooth and uniform glaze film. In this way, the glazed surface is smoother and has a mirror-like touch and gloss.

(7) The liquid reinforcing agent used in the present invention increases the dry strength of the blank body, ensures that the tile is not prone to cracking before entering the kiln. In addition, the liquid reinforcing agent is able to completely evaporate at 1100° C. to 1170° C. without adversely affecting the quality of the ceramic tile product, i.e., the formation of molten holes, bubbles, color differences, deformation, among others, are prevented.

(8) The grid distributor used in the present invention has an adjustable bolt locking mechanism on its frame to ensure a uniform powder thickness at all directions within the frame. In addition, spring steel is provided on the frame in contact with the surface of the mold frame, which allows the grid distributor to be in full flexible contact with the surface of the mold frame of the press. In this way, the grid distributor is no longer prone to deformation loaded with heavy powder materials during operation, leading to more uniform material distribution. The surface of the grids of the grid distributor is coated with PTFE to prevent the powder for the blank body from sticking to the grid distributor and disturbing material distribution. This greatly increases the production rate and distribution uniformity.

(9) The hopper provided at the top of the press is installed with a powder homogenizer in its middle. The powder homogenizer consists of an upper funnel and a lower funnel. The upper funnel and the lower funnel are installed in opposite orientations at a distance of 10-20 cm from each other; that is, a bigger mouth (the diameter of which is ⅓-⅖ of the diameter of the hopper at the top of the press) of the upper funnel is facing up, and a smaller mouth (the diameter of which is ⅛-⅙ of the diameter of the hopper at the top of the press) of the upper funnel is facing down, and is fixed to the center of the hopper at the top of the press via an iron frame. The smaller mouth (the diameter of which is 1/12-1/10 of the diameter of the hopper at the top of the press) of the lower hopper is facing up, the bigger mouth (the diameter of which is ⅙-¼ of the diameter of the hopper at the top of the press) of the lower hopper is facing down, and is fixed directly above the cross center of stainless steel partitions in the hopper. When the conveyor belt sends the same material falling from different silos to the top of the hopper at the top of the press through an inclined hopper, the material can be evenly distributed to each small silo compartment through the powder homogenizer to homogenize the powder before pressing. This allows the powder to have consistent humidity and grain composition during pressing, which increases the smoothness of the blank surface and the compactness and uniformity of the blank body, while reducing defects such as sandwiched layers and bulging in the blank body.

(10) In the present invention, by setting a number of polishing groups, the tiles are gradually cut and polished to reach a desirable cutting and polishing volume. Setting multiple polishing groups ensures that the dried blank body has a smoother surface while reducing damage to the tile.

(11) It has been found in the production of ceramic tile products that the carbon (C) content in the raw material will impact the proportion of pinhole defects developed on the glazed surface, the firing speed, and inherent qualities of the product. The inventors have studied the relationship between carbon content in the raw material and product quality and determined the desirable carbon content and amount of clay in the raw material, as well as their combinatorial usage. Clay is classified based on its carbon content: clay with a carbon content of ≥3.0 wt % is classified as high-carbon clay; clay with a carbon content of between 0.5 wt % and 3.0 wt % is classified as medium-high carbon clay; clay with a carbon content of ≤0.5 wt % is classified as low-carbon clay.

The glaze surface roughness (Ra) of the product of the present invention is in the range of 0.792 μm to 1.12 μm and Rz is in the range of 7.3 μm to 10.42 μm. Research indicates that when the Ra of a glazed surface is around 1 μm and Rz is around 10 μm, the product's glazed surface is smooth and glossy.

DETAILED DESCRIPTION OF THE ILLUSTRATED EMBODIMENTS

The present invention will be described in further detail below with embodiments.

The blank material for the ceramic tile consists of the following components in percentage by weight: nepheline powder: 10%-15%; clay with a carbon content of ≥3.0 wt %: 10%-15%; clay with a carbon content of ≤0.5 wt %: 15%-22%; clay with a carbon content of >0.5 wt % and <3.0 wt %: 10%-15%; recycled waste blank: 5%-10%; sodium potassium powder: 5%-10%; sodium feldspar powder: 12%-20%; desulfurization residue: 0%-7%; waste from edging and polishing: 15%-26%; waste porcelain powder: 5%-10%; liquid gel remover: 0.3%-1.0%; liquid reinforcing agent: 0.2%-0.8%.

In the present embodiment, the waste from edging and polishing consists of water and a solid waste gathered from edging and polishing of a semi-finished ceramic product. The main chemical components of the solid waste comprise $SiO_2$, $Al_2O_3$, CaO, $K_2O$, $Na_2O$, MgO, $MgCl_2$, and SiC, wherein a total content of $SiO_2$ and $Al_2O_3$ is greater than 83 wt %; the waste from edging and polishing has a water content of 32 wt % to 36 wt %. Water content refers to the ratio of the mass of water to the mass of waste residue.

The waste from edging and polishing is mainly the solid waste produced during cold working at a later stage of ceramic tile production, that is, after grinding, polishing, edging, chamfering, and other procedures, the solid waste produced during flocculation, sedimentation, pressure filtration, and other processes. This solid waste includes fine particles that are produced during polishing or grinding, that is, fine particles from the grinding of the blank material, the glaze material, and mounted points. The recycled waste blank is from missing corners and clay blanks (not fired) produced during the manufacturing process; these materials are partially dissolved in water to form a slurry or are directly ball-milled to be reused in a clay slurry for the blank. The waste porcelain powder is a material having a desirable particle size obtained after a series of crushing treatments on defective tile products, followed by sieving.

In the present embodiment, the liquid gel remover is one or more selected from the group consisting of methacrylic acid, sodium methallylsulfonate, sodium persulfate, hydroquinone, polyimide, sodium hydroxide, sodium chloride, and sodium carbonate; the pH of the liquid gel remover is 7.0 to 9.0.

In the present embodiment, the liquid reinforcing agent is one or more selected from the group consisting of modified lignin, polyvinyl alcohol, polyacrylate, sodium polyacrylate, water glass, and a phosphate salt.

The liquid reinforcing agent increases the dry strength of the blank body, ensures that the tile is not prone to cracking before entering the kiln. In addition, the liquid reinforcing agent is able to completely evaporate at medium and high temperatures without affecting the quality of the ceramic tile product, i.e., the formation of molten holes, bubbles, color differences, deformation, among others, is prevented.

The method for preparing a matte ceramic tile comprises the following steps:

(1) preparing raw materials for a blank body: preparing the raw materials according to a predetermined ratio, feeding the raw materials directly into a three-stage continuous ball mill, adding water to obtain a mixture with a water content of 32 wt % to 35 wt %, and ball milling continuously for 2 to 5 hours to obtain a slurry; the raw materials include waste from edging and polishing, desulfurization residue, waste porcelain powder, nepheline powder, sodium potassium powder, potassium feldspar powder, and a carbon-containing clay; the desulfurization residue in step (1) is a desulfurized gypsum produced by treating a kiln flue gas with a wet desulfurization method; a main component of the desulfurized gypsum is calcium sulfate dihydrate ($CaSO_4 \cdot 2H_2O$) crystal, a major impurity of the desulfurized gypsum is calcium carbonate; the desulfurized gypsum has a purity of 90% to 95%, a water content of 10 wt % to 15 wt %, and a particle size of 30 nm to 50 nm.

The carbon-containing clay in step (1) is selected from one of the following: (1) clay with a carbon content of ≥3.0% and clay with a carbon content of ≤0.5%; (2) clay with a carbon content of ≤0.5%; and (3) clay with a carbon content of ≤0.5% and clay with a carbon content of >0.5% and <3.0%.

(2) powder spray granulation: storing the slurry produced by the continuous ball mill in an underground slurry tank; transferring the slurry into a drying tower by a plunger pump after aging and homogenization for powder spray granulation; a powder obtained by powder spray granulation has a volumetric weight of 1.0 to 1.1 $g/cm^3$ and a water content of 6.0 wt % to 6.5 wt %.

(3) Aging: conveying the powder obtained by powder spray granulation to a powder silo directly with a belt, aging the powder in the powder silo for more than 48 hours before pressing and molding; water content of the powder after aging is 5.0% to 6.0%.

(4) Pressing and molding of the blank body: transporting the powder after aging to a hopper provided at the top of a press; pushing the powder into a mold frame of the press by a grid distributor; applying pressure to the powder by the press to partially release gas trapped in voids of the powder, causing powder particles to shift and combine through internal frictional forces to take on a desired shape, forming a blank body; the shape of the blank body formed has a cross-section identical to that of a mold, and shapes of an upper surface and a lower surface of the blank body are determined by shapes of an upper press mold and a lower press mold in the mold frame.

(5) Drying: drying the blank body in a roller hearth furnace having 3 to 5 layers; a maximum drying temperature is 160° C. to 200° C., drying time is 30 min to 60 min; strength of the blank body after drying is 1.2 Mpa to 1.8 Mpa, a water content of a dried blank body is <0.1 wt %.

(6) Polishing the blank body: polishing a surface of the blank body coming out from the roller hearth furnace by a blank body polishing machine.

(7) Spraying water: spraying water onto the upper surface of the blank body by a high-pressure water-spraying cabinet equipped with a spray gun; the spray gun has a nozzle size of 0.36 mm; water pressure during spraying is 12 bar to 18 bar, water is sprayed in an amount of 55 $g/m^2$ to 100 $g/m^2$.

(8) Glazing: glazing is performed using a linear glazing machine with the following process parameters: specific gravity of a glaze slurry: 1.45 to 1.80; time taken for a glaze slurry to flow out of a viscometer, determined according to Chinese national standard GB/T1723 Paint Viscosity Determination Method: 18 s to 30 s (which means a viscosity of 10~40 mPa·s); and a thickness of a glaze layer: 0.03 mm to 0.1 mm Specific gravity, also known as relative density, is a measure of the density of a glaze slurry in comparison to the density of water. In the Paint Viscosity Determination Method, a Paint-4 Viscometer is used to measure the viscosity of fluids. The viscosity of fluids is expressed as the elapse time (unit: second) of a sample flowing out from a standard effuse hole after filling the sample in a specific container. Viscosity can be converted into kinematic viscosity by mathematical calculation.

The glaze is a matte glaze slurry consisting of a leveling agent and a matte glaze slurry.

The leveling agent is one or more selected from the group consisting of a polyacrylic acid leveling agent, a phosphate ester modified acrylic acid leveling agent, a fluorine modified acrylic acid leveling agent, a butyl acrylate leveling agent, a silicone leveling agent, a polyether polyester modified silicone leveling agent, a polyether-modified silicone, a polymethylalkylsiloxane, an alkyl-modified organosiloxane, an end-group modified silicone, and a fluorocarbon leveling agent.

The matt glaze slurry consists of 20 wt %-30 wt % of the levelling agent and 70 wt %-80 wt % of the matte slurry.

The matte glaze slurry is made from ball-milling 64 wt %-74 wt % of a matte glaze powder, 0.2 wt %-1.2 wt % of an additive, and 25 wt %-35 wt % of water for 5 to 8 hours; fineness of the matte glaze slurry is to an extent that 0.8 wt %-1.2 wt % of the matte glaze slurry is unable to pass a 325 mesh sieve.

The matte glaze powder consists of the following components: nepheline: 8 wt %-13 wt %; albite: 5 wt %-10 wt %; FMC633 frit: 10 wt %-15 wt %; FMC689 frit: 28 wt %-35 wt %; FMC053 frit: 8 wt %-12 wt %; zinc phosphate: 2 wt %-10 wt %; zinc oxide: 2 wt %-6 wt %; wollastonite: 2 wt %-5 wt %; aluminium oxide: 1 wt %-7 wt %; bentonite: 0 wt %-1 wt %; ultrafine zirconia ($ZrO_2$): 0 wt %-10 wt %; recycled material from scrapping: 5 wt %-15 wt %; ball clay: 7 wt %-10 wt %; carboxymethyl cellulose: 0.2 wt %-0.3 wt %; sodium tripolyphosphate: 0.3 wt %-0.5 wt %.

The ultrafine zirconia has $D_{50}$ of below 0.47 μm, $D_{90}$ of below 1.0 μm; $ZrO_2$ has a purity of ≥93.27, a refractive index of 1.93-2.01, a melting point of 2370° C. to 2700° C.

Ultrafine zirconia is defined as having $D_{50}$ of below 0.47 μm and $D_{90}$ of below 1.0 μm.

Calcium and magnesium are introduced into a formulation of the FMC633 frit; the FMC633 frit comprises the following main chemical components in percentage by weight:

ignition loss (I.L)≤0.05%; $SiO_2$: 51.35%; $Al_2O_3$: 11.97%; $Fe_2O_3$: 0.05%; CaO: 17.92%; MgO: 8.25%; $K_2O$: 2.86%; $Na_2O$: 2.39%; $ZrO_2$: 5.16%.

The FMC633 frit has a maturation temperature of lower than 1050° C.

Aluminium and calcium are introduced into a formulation of the FMC689 frit; the FMC689 frit comprises the following main chemical components in percentage by weight:

I.L≤0.05%; $SiO_2$: 54.52%; $Al_2O_3$: 21.73%; $Fe_2O_3$: 0.07%; CaO: 15.11%; MgO: 0.23%; $K_2O$: 3.49%; $Na_2O$: 2.43%; $B_2O_3$: 1.89%; ZnO: 0.48%.

the FMC689 frit has a maturation temperature of above 1050° C.

Zinc and zirconium are introduced into a formulation of the FMC053 frit; the FMC053 frit comprises the following main chemical components in percentage by weight:

I.L≤0.05%; $SiO_2$: 44.67%; $Al_2O_3$: 16.36%; $Fe_2O_3$: 0.05%; CaO: 4.1%; MgO: 0.30%; $K_2O$: 1.76%; $Na_2O$: 2.72%; $B_2O_3$: 2.59%; ZnO: 15.03%; $ZrO_2$: 11.20%; $P_2O_5$: 1.17%.

The FMC053 frit has a maturation temperature of 1100° C. to 1170° C.

The recycled material from scrapping consists of a blank material and a glaze material, wherein the glaze material comprises a base glaze and a transparent glaze, the recycled material from scrapping has a water content of 9 wt % to 13 wt % and fineness of <1%; the recycled material from scrapping comprises the following chemical components in percentage by weight:

IL.: 5%-6%; $SiO_2$: 59%-61%; $Al_2O_3$: 20%-21%; $Fe_2O_3$: 0.1%-0.2%; CaO: 4.5%-5%; MgO: 3%-3.8%; $K_2O$: 1%-1.5%; $Na_2O$: 2.5%-3%; and $ZrO_2$: 0.2%-0.8%.

(9) Applying a decorative pattern: applying a decorative pattern to a glazed surface of the blank body via any one of screen printing, rubber roller printing, and inkjet printing; and

(10) Firing: transferring a decorated blank body from the previous step to a firing kiln for firing at a firing temperature of 1050° C. to 1170° C. and a firing time of 50 min to 80 min, wherein a firing time for a stage of between 1150° C. to 1170° C. is 6 min to 10 min.

The description above is only the preferred embodiments of the present invention. Any alterations, modifications, and equivalent substitutions made by a person having ordinary skill in the art all fall within the protection scope of the present invention.

What is claimed is:

1. A matte ceramic tile, wherein a blank material for the ceramic tile consists of the following components in percentage by weight:
   nepheline powder: 10%-15%;
   clay with a carbon content of ≥ 3.0 wt %: 10%- 15%;
   clay with a carbon content of ≤ 0.5 wt %: 15%- 22%;
   clay with a carbon content between 0.5 wt % and 3.0 wt %: 10%- 15%;
   recycled waste blank: 5%-10%;
   sodium potassium powder: 5%-10%;
   sodium feldspar powder: 12%-20%;
   desulfurization residue: 0%-7%;
   waste from edging and polishing: 15%-26%;
   waste porcelain powder: 5%-10%;
   liquid gel remover: 0.3%-1.0%;
   liquid reinforcing agent: 0.2%-0.8%;
   wherein the desulfurization residue is a desulfurized gypsum; the desulfurized gypsum comprises calcium sulfate dihydrate ($CaSO_4 \cdot 2H_2O$) crystal and water, with a mass proportion of water ranging from 25-35%,
   wherein the recycled waste blank is from unfired clay blanks produced during ceramic tile production,
   wherein the waste from edging and polishing is solid waste produced during cold working at a later stage of the ceramic tile production, and
   wherein the waste porcelain powder is ceramic tile powder having a desirable particle size obtained after a series of crushing treatments on defective ceramic tiles.

2. The matte ceramic tile according to claim 1, wherein the waste from edging and polishing consists of water and a solid waste gathered from edging and polishing of a semi-finished ceramic product, the solid waste comprises $SiO_2$, $Al_2O_3$, CaO, $K_{2O}$, $Na_2O$, MgO, $MgCl_2$, and SiC, wherein a total content of $SiO_2$, $Al_2O_3$ is greater than 83 wt %; the waste from edging and polishing has a water content of 32 wt % to 36 wt %.

3. The matte ceramic tile according to claim 1, wherein the liquid gel remover is one or more selected from the group consisting of methacrylic acid, sodium methallylsulfonate, sodium persulfate, hydroquinone, polyimide, sodium hydroxide, sodium chloride, and sodium carbonate; the liquid gel remover has a pH of 7.0 to 9.0.

4. The matte ceramic tile according to claim 1, wherein the liquid reinforcing agent is one or more selected from the group consisting of modified lignin, polyvinyl alcohol, polyacrylate, sodium polyacrylate, water glass, and a phosphate salt.

5. A method for preparing a matte ceramic tile, comprising the following steps:
   (1) preparing raw materials for a blank body: preparing the raw materials according to a predetermined ratio, feeding the raw materials directly into a three-stage continuous ball mill, adding water to obtain a mixture with a water content of 32 wt % to 35 wt %, and ball milling continuously for 2 to 5 hours to obtain a slurry; wherein the raw materials comprise waste from edging and polishing, desulfurization residue, waste porcelain powder, nepheline powder, sodium potassium powder, potassium feldspar powder, and a carbon-containing clay;
   (2) powder spray granulation: storing the slurry produced by the continuous ball mill in an underground slurry tank; transferring the slurry into a drying tower by a plunger pump after aging and homogenization for powder spray granulation; a powder obtained by powder spray granulation has a volumetric weight of 1.0 to 1.1 g/cm3 and a water content of 6.0 wt % to 6.5 wt %;
   (3) aging: conveying the powder obtained by powder spray granulation to a powder silo directly with a belt, aging the powder in the powder silo for more than 48 hours before pressing and molding; water content of the powder after aging is 5.0 wt % to 6.0 wt %;
   (4) pressing and molding of the blank body: transporting the powder after aging to a hopper provided at a top of a press; pushing the powder into a mold frame of the press by a grid distributor; applying pressure to the powder by the press to partially release gas trapped in voids of the powder, causing powder particles to shift and combine through internal frictional forces to take on a desired shape, forming a blank body; the shape of the blank body formed has a cross-section identical to that of a mold, and shapes of an upper surface and a lower surface of the blank body are determined by shapes of an upper press mold and a lower press mold in the mold frame;
   (5) drying: drying the blank body in a roller hearth furnace having 3 to 5 layers; a maximum drying temperature is 160° C. to 200°° C., drying time is 30 min to 60 min; strength of the blank body after drying is 1.2 Mpa to 1.8 Mpa, a water content of a dried blank body is <0.1 wt %;
   (6) polishing the blank body: polishing a surface of the blank body coming out from the roller hearth furnace by a blank body polishing machine;
   (7) spraying water: spraying water onto the upper surface of the blank body by a high-pressure water-spraying cabinet equipped with a spray gun; the spray gun has a nozzle size of 0.36 mm; water pressure during spraying is 12 bar to 18 bar, water is sprayed in an amount of 55 g/m$^2$ to 100 g/m$^2$;
   (8) glazing: glazing is performed using a linear glazing machine with the following process parameters:
   specific gravity of a glaze slurry: 1.45 to 1.80;
   time taken for a glaze slurry to flow out of a viscometer, determined according to Chinese national standard GB/T1723 Paint Viscosity Determination Method: 18 s to 30s; and
   a thickness of a glaze layer: 0.03 mm to 0.1 mm;
   (9) applying a decorative pattern: applying a decorative pattern to a glazed surface of the blank body via any one of screen printing, rubber roller printing, and inkjet printing; and
   (10) firing: transferring a decorated blank body from the previous step to a firing kiln for firing at a firing temperature of 1050° C. to 1170° C. and a firing time of 50 min to 80 min, wherein a firing time for a stage of between 1150° C. to 1170° C. is 6 min to 10 min,
   wherein the waste from edging and polishing is solid waste produced during cold working at a later stage of ceramic tile production, and
   wherein the waste porcelain powder is ceramic tile powder having a desirable particle size obtained after a series of crushing treatments on defective ceramic tiles.

6. The method for preparing the matte ceramic tile according to claim 5, wherein the desulfurization residue in step (1) is a desulfurized gypsum; a main component of the desulfurized gypsum is calcium sulfate dihydrate ($CaSO_4 \cdot 2H_2O$) crystal, a major impurity of the desulfurized gypsum is calcium carbonate; the desulfurized gypsum has a purity of 90% to 95%, a water content of 10 wt % to 15 wt %, and a particle size of 30 nm to 50 nm.

7. The method for preparing the matte ceramic tile according to claim 5, wherein the carbon-containing clay in step (1) is selected from one of the following:
   (1) clay with a carbon content of ≥ 3.0 wt % and clay with a carbon content of ≤ 0.5 wt %;
   (2) clay with a carbon content of ≤ 0.5 wt %; and
   (3) clay with a carbon content of ≤ 0.5 wt % and clay with a carbon content between 0.5 wt % and 3.0 wt %.

8. The method for preparing the matte ceramic tile according to claim 5, wherein the glaze in step (8) is a matte glaze slurry consisting of a leveling agent and a matte glaze slurry;
   the leveling agent is one or more selected from the group consisting of a polyacrylic acid leveling agent, a phosphate ester modified acrylic acid leveling agent, a fluorine modified acrylic acid leveling agent, a butyl acrylate leveling agent, a silicone leveling agent, a polyether polyester modified silicone leveling agent, a polyether-modified silicone, a polymethylalkylsiloxane, an alkyl-modified organosiloxane, an end-group modified silicone, and a fluorocarbon leveling agent;
   the matt glaze slurry consists of 20 wt %-30 wt % of the levelling agent and 70 wt %-80 wt % of the matte slurry;
   the matte glaze slurry is made from ball-milling 64 wt %-74 wt % of a matte glaze powder, 0.2 wt %- 1.2 wt % of an additive, and 25 wt %-35 wt % of water for 5 to 8 hours; fineness of the matte glaze slurry is to an extent that 0.8 wt %-1.2 wt % of the matte glaze slurry is unable to pass a 325 mesh sieve.

9. The method for preparing the matte ceramic tile according to claim 8, wherein the matte glaze powder consists of the following components:
   nepheline: 8 wt %-13 wt %;
   albite: 5 wt %-10 wt %;
   FMC633 frit: 10 wt %-15 wt %;
   FMC689 frit: 28 wt %-35 wt %;
   FMC053 frit: 8 wt %-12 wt %;
   zinc phosphate: 2 wt %-10 wt %;
   zinc oxide: 2 wt %-6 wt %;
   wollastonite: 2 wt %-5 wt %;
   aluminium oxide: 1 wt %-7 wt %;
   bentonite: 0 wt %-1 wt %;
   ultrafine zirconia ($ZrO_2$): 0 wt %-10 wt %;

recycled material from scrapping: 5 wt %-15 wt %;
ball clay: 7 wt %-10 wt %;
carboxymethyl cellulose: 0.2 wt %-0.3 wt %;
sodium tripolyphosphate: 0.3 wt %-0.5 wt %;
the ultrafine zirconia has $D_{50}$ of below 0.47 μm, $D_{90}$ of below 1.0μm; $ZrO_2$ has a purity of ≥93.27, a refractive index of 1.93-2.01, a melting point of 2370° C. to 2700° C.,
wherein the recycled material from scrapping comprises the following chemical components in percentage by weight:
$H_2O$: 9%- 13%;
ignition loss (I.L): 5%-6%;
$SiO_2$: 59%-61%;
$Al_2O_3$: 20%-21%;
$Fe_2O_3$:0.1%-0.2%;
CaO: 4.5%-5%;
MgO: 3%-3.8%;
$K_2O$: 1%-1.5%;
$Na_2O$:2.5%-3%; and
$ZrO_2$:0.2%-0.8%.

10. The method for preparing the matte ceramic tile according to claim 9, wherein calcium and magnesium are introduced into a formulation of the FMC633 frit; the FMC633 frit comprises the following main chemical components in percentage by weight:
  ignition loss (I.L) ≤0.05%;
  $SiO_2$:51.35%;
  $Al_2O_3$:11.97%;
  $Fe_2O_3$:0.05%;
  CaO: 17.92%;
  MgO: 8.25%;
  $K_2O$: 2.86%;
  $Na_2O$: 2.39%;
  $ZrO_2$: 5.16%;
  the FMC633 frit has a maturation temperature of lower than 1050° C.;
aluminium and calcium are introduced into a formulation of the FMC689 frit; the FMC689 frit comprises the following main chemical components in percentage by weight:
I.L≤0.05%;
$SiO_2$:54.52%;
$Al_2O_3$:21.73%;
$Fe_2O_3$:0.07%;
CaO: 15.11%;
MgO: 0.23%;
$K_2O$: 3.49%;
$Na_2O$: 2.43%;
$B_2O_3$:1.89%;
ZnO: 0.48%;
the FMC689 frit has a maturation temperature of above 1050° C.;
zinc and zirconium are introduced into a formulation of the FMC053 frit; the FMC053 frit comprises the following main chemical components in percentage by weight:
I.L ≤0.05%;
$SiO_2$:44.67%;
$Al_2O_3$:16.36%;
$Fe_2O_3$:0.05%;
CaO: 4.1%;
MgO: 0.30%;
$K_2O$: 1.76%;
$Na_2O$: 2.72%;
$B_2O_3$:2.59%;
ZnO: 15.03%;
$ZrO_2$:11.20%;
$P_2O_5$:1.17%;
the FMC053 frit has a maturation temperature of 1100° C. to 1170° C.;
the recycled material from scrapping has fineness of <1%.

* * * * *